Patented Oct. 1, 1929

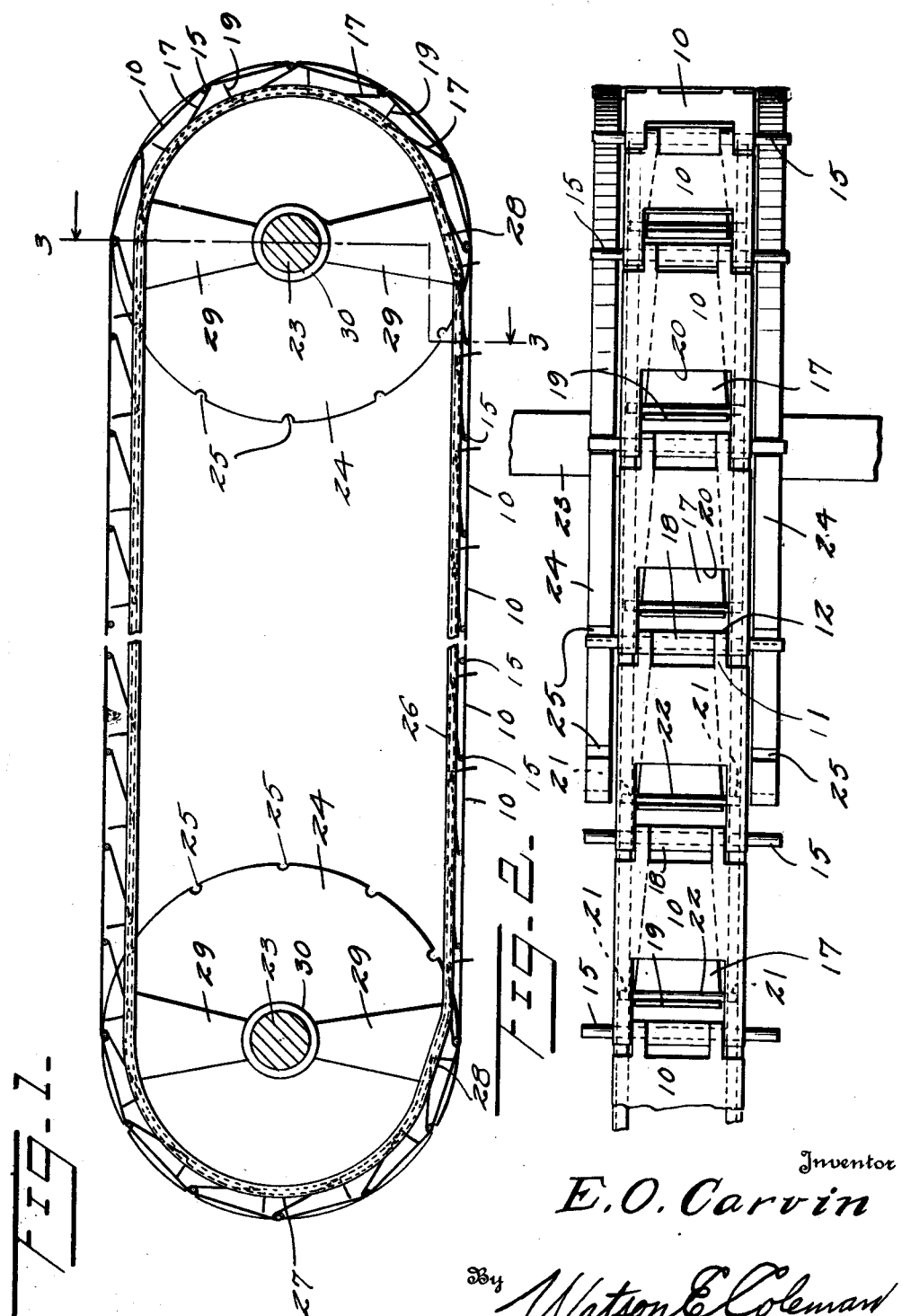

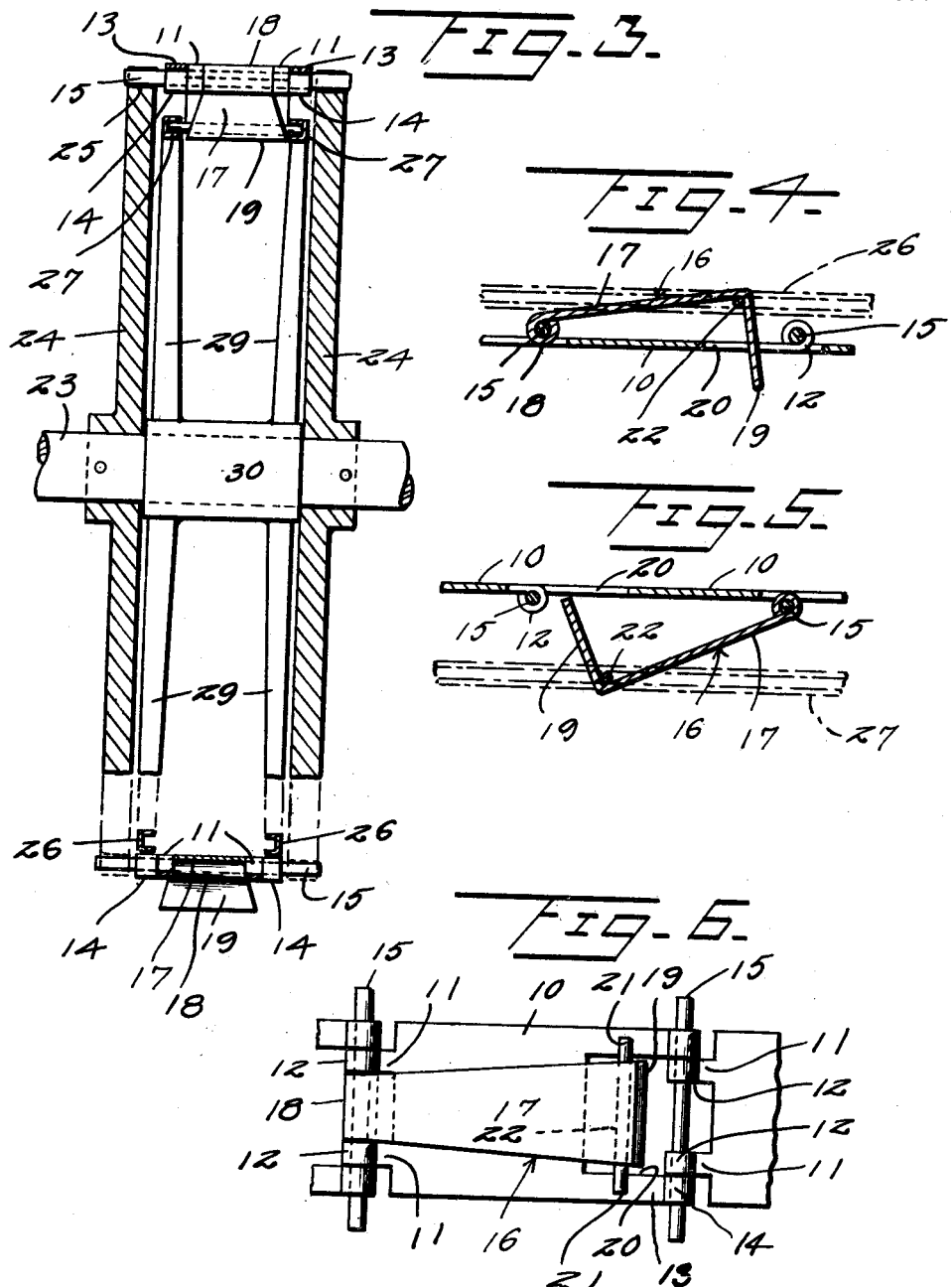

1,730,059

UNITED STATES PATENT OFFICE

EDWARD O. CARVIN, OF SIERRA CITY, CALIFORNIA

ENDLESS BELT FOR TRACTORS, CONVEYERS, AND THE LIKE

Application field June 23, 1928. Serial No. 287,792.

This invention relates to endless belts for use on tractors, conveyers or similar apparatus, and has for an important object thereof the provision of a structure providing an endless traveling belt having associated therewith traction or conveyer lugs and means for controlling the operation thereof.

A further object of the invention is the provision of a belt of this character which may be very readily and cheaply constructed and assembled and which will be durable and efficient in service.

A further object of the invention is the provision in a device of this character of a novel and improved construction and mounting of traction lugs permitting the same to be extended or withdrawn as their use becomes necessary or unnecessary.

A further object of the invention is to provide a structure such that the belt may be formed in sections and the pivotal connections of the sections may serve as a mounting for the traction lugs.

These and other objects I attain by the construction shown in the accompanying drawings, wherein for the purpose of illustration is shown a preferred embodiment of my invention and wherein:—

Figure 1 is a longitudinal sectional view through an endless belt constructed in accordance with my invention;

Figure 2 is a fragmentary plan view thereof;

Figure 3 is a vertical sectional view therethrough on the line 3—3 of Figure 1;

Figures 4 and 5 are detail sectional views showing the operation of the lugs;

Figure 6 is an inner face view of a section of the belt.

Referring now more particularly to the drawings, the numeral 10 generally designates a leaf of a traveling belt comprising a flat body which may be either cast or formed from sheet material. This body has at one end a pair of short arms 11 which are inset from the sides thereof and are provided at their ends with transversely extending pivot eyes 12 and at the opposite end thereof a pair of relatively long arms 13, which are likewise provided at their outer ends with transversely extending eyes 14. The eyes 14 have their inner edges aligned with the outer edges of the eyes 12, so that the eyes 12 of one of the leaves may be inserted between the eyes 14 of a second leaf and align therewith for the reception of a pivot shaft 15. This pivot shaft is of greater length than the width of the leaves, so that it projects beyond the sides thereof, for a purpose presently to appear.

The numeral 16 generally designates traction elements, each comprising a body 17 having at one end an eye 18 of a width to fit between the inner faces of the eyes 12 and receive the pivot shaft 15 directed through these eyes and at its opposite end a terminal flange 19, the side faces of which are spaced from one another a distance such that this flange may pass through the opening 20 between the long arms 13 of the leaf with which they are associated.

Secured to the end of the body, preferably at the angle between the body and flange, are outwardly extending lugs 21. These lugs may be conveniently provided by securing a shaft or bar 22 in the re-entrant angle between the body and flange.

In combination with a structure of this character, I employ a propelling structure for the belt including spaced shafts 23 which may be driven in any suitable manner and which have each secured thereto a pair of spaced wheels 24 having notches 25 in their peripheries to receive the projecting ends of the pivot shafts 15. I further provide a pair of channel tracks so shaped that along the working run of the traveling belt, the sections 26 thereof closely approach this belt while, during the balance of travel of the belt, they are withdrawn therefrom, as indicated at 27, inclined or camming sections 28 connecting the sections 26 with the sections 27. These tracks receive the lugs at the opposite sides of the traction lugs and guide these traction lugs in their movements. When the lugs are engaged in the runs 26, the traction lugs are projected beyond the outer surface of the belt and are in operative position. As they engage the section 28, they are gradually withdrawn until, arriving at the section 27, they are completely withdrawn and do not project beyond the outer face of the belt. The guiding tracks may be supported in any suitable way, although the structure illustrated in the drawings may be conveniently employed. This structure comprises standards 29 which are secured to the tracks adjacent opposite ends thereof and are centrally formed as bearings 30 through which the shafts 23 are passed.

It will be obvious that a structure of this character may be very readily and cheaply produced and will be durable and efficient in its operation.

As the flanges are withdrawn at each operation, the traveling face thereof may be cleared by the edge of the body 20 adjacent which they operate, so that clogging in event the device is employed in a tractor is eliminated. In event a lug or leaf becomes broken or damaged, it may be very readily removed and replaced, it being merely necessary to remove the pivot shafts 15 at opposite ends of a leaf to replace the same or the pivot shaft 15 upon which a lug is mounted when the lug is to be replaced.

Since the construction hereinbefore set forth is capable of a certain range of change and modification without materially departing from the spirit of the invention, I do not limit myself to such specific structure except as hereinafter claimed.

I claim:—

1. In an endless belt structure for tractors, conveyers and the like, a belt comprising a plurality of leaves each having at opposite ends thereof eyes adapted to interdigitate with the coacting ends of associated leaves for the reception of pivot pins whereby the leaves may be connected, the connected leaves affording between the eyes thereof a space to receive the eye of a lug likewise adapted to engage the pivot shaft, the eyes at one end of each leaf body being spaced from the body and connected thereto by arms, the adjacent edges of which are spaced to provide an opening, said lug having a flange to extend through the opening.

2. In a tractor, conveyor or the like, a belt comprising a plurality of leaves each having at opposite ends thereof eyes adapted to interdigitate with the coacting ends of associated leaves for the reception of pivot pins whereby the leaves may be connected, the connected leaves affording between the eyes thereof a space to receive the eye of a lug likewise adapted to engage the pivot shaft, the eyes at one end of each leaf body being spaced from the body and connected thereto by arms the adjacent edges of which are spaced to provide an opening, said lug having a flange to extend through the opening, pairs of driven disks having notches in their peripheries, said pivot pins extending beyond the side faces of the leaves for engagement in the notches of the disks, and means for shifting said lugs to alternately extend the flanges thereof through the openings and withdraw the same.

3. In an endless belt structure for tractors, conveyers and the like, a belt comprising a plurality of leaves each having at opposite ends thereof eyes adapted to interdigitate with the coacting ends of associated leaves for the reception of pivot pins whereby the leaves may be connected, the connected leaves each affording between the eyes thereof a space to receive the eye of a lug likewise adapted to engage the pivot shaft, the eyes at one end of each leaf body being spaced from the body and connected thereto by arms the adjacent edges of which are spaced to provide an opening, said lug having a flange to extend through the opening, and means associated with said lugs for alternately shifting the flanged ends of the lugs toward and away from the associated leaves as the belt is shifted.

4. In a tractor, conveyer or the like, a belt comprising a plurality of leaves each having at opposite ends thereof eyes adapted to interdigitate with the coacting ends of associated leaves for the reception of pivot pins whereby the leaves may be connected, the connected leaves each affording between the eyes thereof a space to receive the eye of a lug likewise adapted to engage the pivot shaft, the eyes at one end of each leaf body being spaced from the body and connected thereto by arms the adjacent edges of which are spaced to provide an opening, said lug having a flange to extend through the opening, pairs of driven disks having notches in their peripheries, said pivot pins extending beyond the side faces of the leaves for engagement in the notches of the disks, said lug having projections at its side and tracks in which said projections operate guiding said lugs to alternately shift the flanged ends thereof toward and away from the associated leaf.

5. In an endless belt structure for tractors, conveyers and the like, a belt comprising a plurality of leaves each having at opposite ends thereof eyes, each leaf having an opening, a lug associated with each leaf and likewise having an eye, said lug having a flange projectible through the opening, and pivot pins connecting the eyes of adjacent leaves and pivotally connecting each lug to its associated leaf.

6. In an endless belt structure for tractors, conveyers and the like, a belt comprising a plurality of leaves each having at opposite ends thereof eyes, each leaf having an opening, a lug associated with each leaf and likewise having an eye, said lug having a flange projectible through the opening, pivot pins connecting the eyes of adjacent leaves and pivotally connecting each lug to its associated leaf, means for causing travel of the belt, and means engaged by said lugs operating during travel of the belt to alternately shift the flanged end of the lug toward and away from the associated leaf.

7. In an endless belt structure for tractors, conveyers and the like, a belt comprising a plurality of leaves each having at opposite ends thereof eyes, each leaf having an opening, a lug associated with each leaf and likewise having an eye, said lug having a flange projectible through the opening and pivot pins connecting the eyes of adjacent leaves and pivotally connecting each lug to its associated leaf, said pivot pins projecting beyond the sides of the leaves to form elements for engagement with a sprocket.

In testimony whereof I hereunto affix my signature.

EDWARD O. CARVIN.